United States Patent
Honma

(10) Patent No.: US 8,052,573 B2
(45) Date of Patent: Nov. 8, 2011

(54) VEHICLE SHIFT CONTROL APPARATUS

(75) Inventor: Tomoaki Honma, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 617 days.

(21) Appl. No.: 12/264,440

(22) Filed: Nov. 4, 2008

(65) Prior Publication Data

US 2009/0137364 A1 May 28, 2009

(30) Foreign Application Priority Data

Nov. 27, 2007 (JP) ................................ 2007-305464

(51) Int. Cl.
*B60W 10/00* (2006.01)
(52) U.S. Cl. .......................................... 477/77; 477/120
(58) Field of Classification Search .................... 477/70, 477/73, 74, 77, 80, 83, 84, 115, 120
See application file for complete search history.

(56) References Cited

U.S. PATENT DOCUMENTS

| 6,712,735 B2 * | 3/2004 | Hayabuchi et al. | 477/68 |
| 7,962,267 B2 * | 6/2011 | Honma et al. | 701/51 |

FOREIGN PATENT DOCUMENTS

JP 2007-40409 A 2/2007

* cited by examiner

*Primary Examiner* — Justin Holmes
(74) *Attorney, Agent, or Firm* — Global IP Counselors, LLP

(57) ABSTRACT

A vehicle shift control apparatus is basically provided with an engine, a drive wheel, a transmission and a controller. The transmission is operatively disposed between the engine and the drive wheel for shifting gears by executing a clutch switch operation so as to change a drive transmission path of the transmission. The controller is operatively to the transmission to control a gear shifting of the transmission. The controller includes an engine speed suppressing section that is configured to execute an engine speed suppression control when a driver performs an accelerator operation during the clutch switch operation associated with downshifting while coasting. The engine speed suppression control is further configured to reduce a torque capacity decrease rate of a clutch being released in comparison with a torque capacity decrease rate that would occur if shifting was taking place during normal coasting in which the accelerator operation is not performed.

7 Claims, 5 Drawing Sheets

VEHICLE SHIFT CONTROL APPARATUS

CROSS-REFERENCE TO RELATED APPLICATIONS

This application claims priority to Japanese Patent Application No. 2007-305464, filed on Nov. 27, 2007. The entire disclosure of Japanese Patent Application No. 2007-305464 is hereby incorporated herein by reference.

BACKGROUND OF THE INVENTION

1. Field of the Invention

The present invention generally relates to a vehicle shift control apparatus for a transmission. More specifically, the present invention relates to a vehicle shift control apparatus where the transmission is arranged between an engine and a drive wheel for shifting gears by executing a clutch switch operation (connecting and disconnecting clutches) so as to change a drive transmission path.

2. Background Information

Japanese Laid-Open Patent Publication No. 2007-040409 discloses a twin-clutch automatic manual transmission in which a plurality of gears is divided into an odd numbered gear group and an even numbered gear group. The twin clutch automatic manual transmission has a first clutch that is connected when a gear in the odd numbered gear group is selected and a second clutch that is connected when a gear in the even numbered gear group is selected.

When this twin clutch automatic manual transmission downshifts from a second gear to a first gear while the vehicle is coasting, the first gear is put into a selected state in advance and the shift operation is completed by releasing the second clutch and connecting the first clutch so as to change from the even gear (second gear) to the odd gear (first gear). This release of the second clutch and connection of the first clutch is called a clutch switch operation.

In view of the above, it will be apparent to those skilled in the art from this disclosure that there exists a need for an improved vehicle shift control apparatus. This invention addresses this need in the art as well as other needs, which will become apparent to those skilled in the art from this disclosure.

SUMMARY OF THE INVENTION

It has been discovered that with conventional technology, discussed above, the clutch capacity of the clutch being connected is increased in accordance with the increase in the engine speed. Thus, even if the driver depresses the accelerator pedal during downshifting while the vehicle is coasting, the clutch capacity of the clutch being connected is increased in accordance with the increase in engine speed. When the torque of the clutch being connected increases, it causes the engine speed to rise and, in response, the torque of the clutch being connected increases even further. As a result, a sharp rise in engine speed is accompanied by a sharp increase in the torque of the clutch being connected and shift shock (gear-shifting shock) occurs.

In view of the state of the known technology, one object is to provide a vehicle shift control apparatus that can suppress the shift shock that occurs when an accelerator of a vehicle is operated during downshifting while the vehicle is coasting.

In order to achieve the aforementioned object, a vehicle shift control apparatus is provided that basically comprises an engine, a drive wheel, a transmission and a controller. The transmission is operatively disposed between the engine and the drive wheel for shifting gears by executing a clutch switch operation so as to change a drive transmission path of the transmission. The controller is operatively to the transmission to control a gear shifting of the transmission. The controller includes an engine speed suppressing section that is configured to execute an engine speed suppression control when a driver performs an accelerator operation during the clutch switch operation associated with downshifting while coasting. The engine speed suppression control is further configured to reduce a torque capacity decrease rate of a clutch being released in comparison with a torque capacity decrease rate that would occur if shifting was taking place during normal coasting in which the accelerator operation is not performed.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
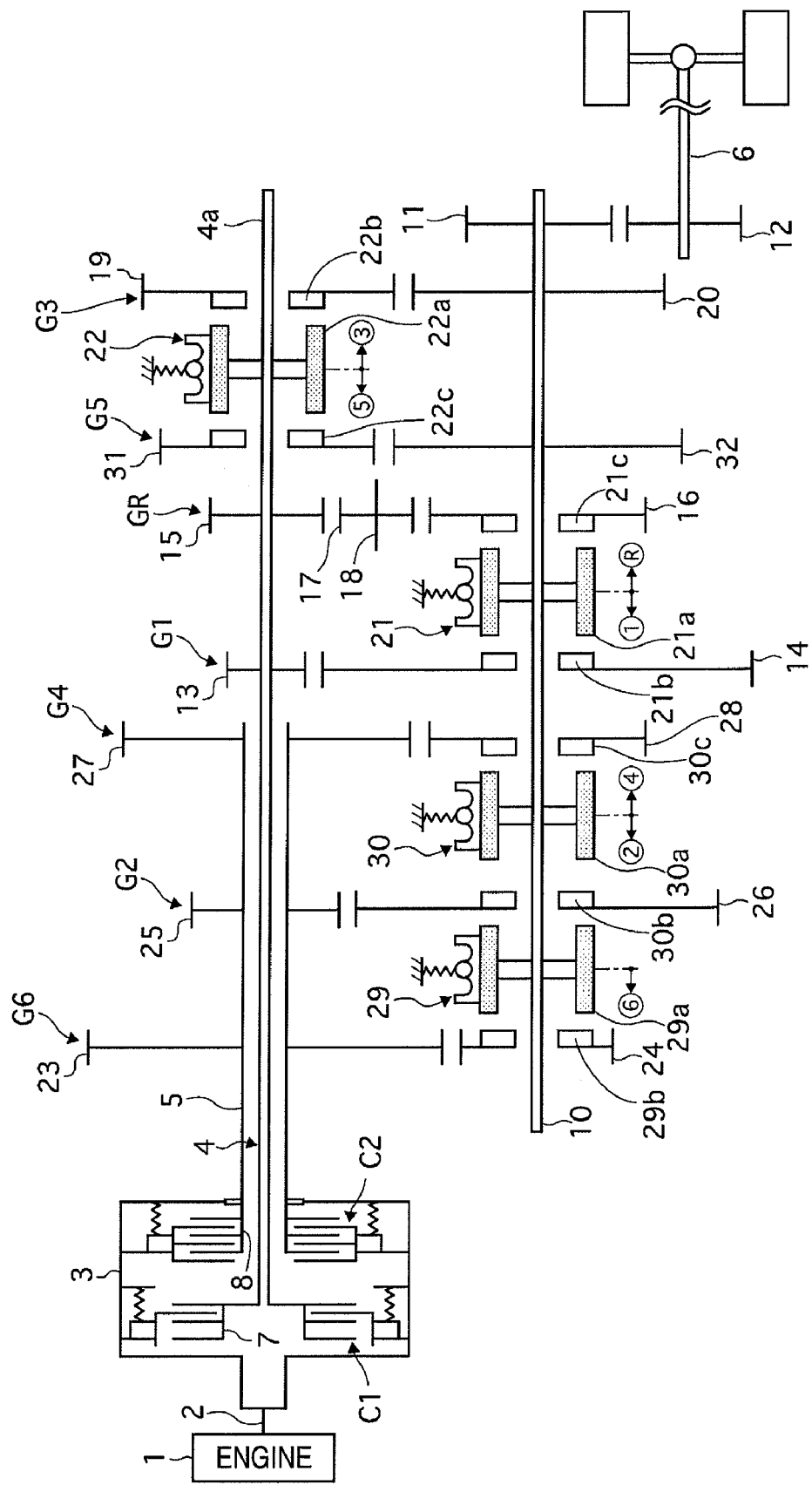
FIG. 1 is a skeleton diagram of a twin-clutch automatic manual transmission in which a vehicle shift control apparatus is employed according to the illustrated embodiment.

Referring initially to FIG. 1, an engine 1 with a skeleton diagram of a twin-clutch automatic manual transmission is illustrated that is equipped with a vehicle shift control apparatus in accordance with one embodiment. The vehicle shift control apparatus of the illustrated embodiment is configured to prevent a sharp increase in engine speed from occurring, during downshifting while the vehicle is coasting, by reducing the torque capacity decrease rate of a clutch being released, and thereby, increasing the engine load. In this way, the vehicle shift control apparatus of the illustrated embodiment can suppress the shift shock that occurs when an accelerator of a vehicle is operated during downshifting while the vehicle is coasting.

The engine 1 is has an output shaft or crankshaft 2 that is drive-connected to a common clutch drum 3. The common clutch drum 3 is shared by a wet clutch C1 for selecting odd numbered gears (first speed, third speed, fifth speed, and reverse) and a wet clutch C2 for selecting even numbered gears (second speed, fourth speed, and sixth speed).

The twin clutch automatic manual transmission is provided with a first input shaft 4 for the odd numbered gears (first speed, third speed, fifth speed, and reverse) and a second input shaft 5 for the even numbered gears (second speed, fourth speed, and sixth speed). The first input shaft 4 is selectively connected to the engine output shaft 2 by using the wet clutch C1, and the second input shaft 5 is selectively connected to the engine output shaft 2 by using the wet clutch C2. The twin clutch automatic manual transmission also has an output shaft 6 arranged to be parallel to the first input shaft 4 and the second input shaft 5. The output shaft 6 is connected to a left drive wheel and a right drive wheel through a propeller shaft and a differential gear as diagrammatically illustrated in FIG. 1.

The gear shifting mechanism of the twin clutch automatic manual transmission will now be explained in detail.

The odd numbered gear clutch C1 and the even numbered gear clutch C2 are configured to select whether the engine rotation is transmitted to the first input shaft 4 or the second input shaft 5. The second input shaft 5 is hollow and the first input shaft 4 is arranged inside the second input shaft 5. The inner first input shaft 4 and the outer second input shaft 5 are arranged to be coaxial and rotatable with respect to each other.

A frontward end (engine-side end) of the first input shaft 4 is connected to a clutch hub 7 of the clutch C1 and a frontward end of the second input shaft 5 is connected to a clutch hub 8 of the clutch C2. The first input shaft 4 protrudes from a rearward end of the second input shaft 5, and the first input shaft 4 is provided with a rearward end portion. A counter shaft 10 is arranged to be parallel to the first input shaft 4, the second input shaft 5, and the output shaft 6.

A counter gear 11 is provided on the rearward end of the counter shaft 10 such that it rotates integrally with the counter shaft 10, and an output gear 12 connected to the output shaft 6 is arranged and configured to mesh with the counter gear 11. The meshing of the counter gear 11 and the output gear 12 constitutes a drive connection between the counter shaft 10 and the output shaft 6.

Gear sets G1, G3 and G5 constituting the odd numbered gear group (first speed, second speed, fifth speed) and a gear set GR constituting a reverse gear are arranged between the rearward end portion 4a of the first input shaft 4 and the counter shaft 10. These gear sets are arranged in the following order from the frontward side (side nearer to the engine 1): first-speed gear set G1, reverse gear set GR, fifth-speed gear set G5, and third-speed gear set G3.

The first-speed gear set G1 comprises a first-speed input gear 13 formed as an integral part of the rearward end portion 4a of the first input shaft 4 and a first-speed output gear 14 rotatably provided on the counter shaft 10. The first-speed input gear 13 and the first-speed output gear 14 are meshed together.

The reverse gear set GR comprises a reverse input gear 15 formed as an integral part of the rearward end portion 4a of the first input shaft 4, a reverse output gear 16 rotatably provided on the counter shaft 10, and a reverse idler gear 17 that meshes with the gears 15 and 16 and reverses the rotational direction of the gear 15 and the rotational direction of the gear 16. The reverse idler gear 17 is rotatably supported on the transmission case by a reverse idler shaft 18.

The third-speed gear set G3 comprises a third-speed input gear 19 rotatably provided on the rearward end portion 4a of the first input shaft 4 and a third-speed output gear 20 that is drive-connected to the counter shaft 10. The third-speed input gear 19 and the third-speed output gear 20 are meshed together.

The fifth-speed gear set G5 comprises a fifth-speed input gear 31 rotatably provided on the rearward end portion 4a of the first input shaft 4 and a fifth-speed output gear 32 that is drive-connected to the counter shaft 10. The fifth-speed input gear 19 and the fifth-speed output gear 20 are meshed together.

Also provided on the counter shaft 10 is a first speed/reverse synchromeshing mechanism (selective meshing mechanism) 21 arranged between the first-speed output gear 14 and the reverse output gear 16. The first speed/reverse synchromeshing mechanism (selective meshing mechanism) 21 comprises a coupling sleeve 21a arranged to rotate together with the counter shaft 10 and two clutch gears 21b and 21c configured to mesh with the coupling sleeve 21a. When the coupling sleeve 21a is moved leftward from the neutral position shown in the figure such that it meshes with the clutch gear 21b, the first-speed output gear 14 becomes drive-connected to the counter shaft 10 and the first speed (first gear) can be selected as will be explained later. Conversely, when the coupling sleeve 21a is moved rightward from the neutral position shown in the figure such that it meshes with the clutch gear 21c, the reverse output gear 16 becomes drive connected to the counter shaft 10 and reverse can be selected as will be explained later.

A third speed/fifth speed synchromeshing mechanism (selective meshing mechanism) 22 is provided on the rearward end portion 4a of the first input shaft 4 between the third-speed input gear 19 and the fifth-speed input gear 31. The third speed/fifth speed synchromeshing mechanism (selective meshing mechanism) 22 comprises a coupling sleeve 22a arranged to rotate together with the first input shaft 4 (i.e., the rearward end portion 4a thereof) and two clutch gears 22b and 22c configured to mesh with the coupling sleeve 22a. When the coupling sleeve 22a is moved rightward from the neutral position shown in the figure such that it meshes with the clutch gear 22b, the third-speed input gear 19 becomes drive-connected to the first input shaft 4 and the third speed (third gear) can be selected as will be explained later. Conversely, when the coupling sleeve 22a is moved leftward from the neutral position shown in the figure such that it meshes with the clutch gear 22c, the fifth-speed output gear 31 becomes drive connected to the first input shaft 4 and the fifth speed can be selected as will be explained later.

Gear sets G2, G4 and G6 constituting the even numbered gear group (second speed, fourth speed, and sixth speed) are arranged between the hollow second input shaft 5 and the counter shaft 10. These gear sets are arranged in the following order from the frontward side (side nearer to the engine 1): sixth-speed gear set G6, second-speed gear set G2, and fourth-speed gear set G4.

The sixth-speed gear set G6 is arranged on a comparatively frontward portion of the second input shaft 5, the fourth-speed gear set G4 is arranged at the rearward end of the second input shaft 5, and the second-speed gear set G2 is arranged on a middle portion of the second input shaft 5 located between the frontward portion and the rearward end of the second input shaft 5.

The sixth-speed gear set G6 comprises a sixth-speed input gear 23 formed as an integral part of the outside circumference of the second input shaft 5 and a sixth-speed output gear 24 rotatably provided on the counter shaft 10. The sixth-speed input gear 23 and the sixth-speed output gear 24 are meshed together.

The second-speed gear set G2 comprises a second-speed input gear 25 formed as an integral part of the outside circumference of the second input shaft 5 and a second-speed output gear 26 rotatably provided on the counter shaft 10. The second-speed input gear 25 and the second-speed output gear 26 are meshed together.

The fourth-speed gear set G4 comprises a fourth-speed input gear 27 formed as an integral part of the outside circumference of the second input shaft 5 and a fourth-speed output gear 28 rotatably provided on the counter shaft 10. The fourth-speed input gear 27 and the fourth-speed output gear 28 are meshed together.

A sixth-speed synchromeshing mechanism (selective meshing mechanism) 29 is provided on the counter shaft 10 between the sixth-speed output gear 24 and the second-speed output gear 26. The sixth-speed synchromeshing mechanism (selective meshing mechanism) 29 comprises a coupling sleeve 29a arranged to rotate together with the counter shaft 10 and a clutch gear 29b configured to mesh with the coupling sleeve 29a. When the coupling sleeve 29a is moved leftward from the neutral position shown in the figure such that it meshes with the clutch gear 29b, the sixth-speed output gear 24 becomes drive-connected to the counter shaft 10 and the sixth speed (sixth gear) can be selected as will be explained later.

A second-speed/fourth-speed synchromeshing mechanism (selective meshing mechanism) 30 is also provided on the counter shaft 10 between the second-speed output gear 26 and the fourth-speed output gear 28. The second-speed/sixth speed synchromeshing mechanism (selective meshing mechanism) 30 comprises a coupling sleeve 30a arranged to rotate together with the counter shaft 10 and two clutch gears 30b and 30c configured to mesh with the coupling sleeve 30a. When the coupling sleeve 30a is moved leftward from the neutral position shown in the figure such that it meshes with the clutch gear 30b, the second-speed output gear 26 becomes drive-connected to the counter shaft 10 and the second speed (second gear) can be selected as will be explained later. Conversely, when the coupling sleeve 30a is moved rightward from the neutral position shown in the figure such that it meshes with the clutch gear 30c, the fourth-speed output gear 28 becomes drive connected to the counter shaft 10 and fourth speed (fourth gear) can be selected as will be explained later.

Automatic shifting executed by the twin clutch automatic manual transmission described heretofore will now be explained.

When the twin clutch automatic manual transmission is put into a non-moving range in which power is not transmitted, e.g., Neutral (N) or Park (P), the wet clutches C1 and C2 are both released and the coupling sleeves 21a, 22a, 29a and 30a of all of the synchromeshing mechanisms 21, 22, 29 and 30 are set to the neutral positions shown in FIG. 1 such that the transmission is in a neutral state in which it does not transmit power. In such a range, both of the clutches C1 and C2 are both in a clutch released state.

In a moving range in which power is transmitted so as to move the vehicle forward, e.g., a D range, or a moving range in which power is transmitted so as to move the vehicle rearward, e.g., an R range, each of the forward gears (speeds) and the reverse gear can be selected by shifting (moving) the coupling sleeves 21a, 22a, 29a, and 30a of the synchromeshing mechanisms 21, 22, 29, and 30 and controlling the engagement states of (connecting or releasing) the clutches C1 and C2. The coupling sleeves 21a, 22a, 29a and 30 and the clutches C1 and C2 are operated using a hydraulic oil from an oil pump (not shown) driven by the engine 1 as an operating medium.

When the transmission is to shift to first speed while in a D range or other forward moving range, the coupling sleeve 21a of the synchromeshing mechanism 21 is moved leftward such that the gear 14 is drive connected to the counter shaft 10. This movement of the coupling sleeve 21a constitutes a pre-shift to the first speed of the odd numbered gear group. After the pre-shift, the first speed is selected (shifted to) by connecting the wet clutch C1 (which was in a released state when the transmission was in a non-moving range).

In this state, the engine torque is transmitted from the clutch C1 to the output shaft 6 through the first input shaft 4, the first-speed gear set G1, the counter shaft 10, and the output gear set comprising the gears 11 and 12 and outputted from the output shaft 6, thereby enabling power to be transmitted with the first speed gear ratio. The clutch C1 is in a connected state and the clutch C2 is in a released state.

When the first speed is selected in order to start the vehicle into motion, a slip connection control is executed to connect the clutch C1 in a manner appropriate for that purpose such that the vehicle starts moving forward smoothly without any shock associated with starting into motion.

When the first gear is selected in response to an operation changing the transmission from the N range to the D range, the pre-shift to the first speed of the odd numbered gears is accompanied by a simultaneous leftward movement of the coupling sleeve 30a of the synchromeshing mechanism 30 such that the gear 26 is drive-connected to the counter shaft 10 and pre-shifting of the second speed of the even numbered gears is also competed. Since the released state of the clutch C2 continues in the same fashion as when the transmission was in a non-moving range, the second speed does not become selected.

When the transmission upshifts from first speed to second speed, since the pre-shift to second speed is completed in advance when the transmission is shifted from the N range to the D range, the upshift from the first speed to the second speed can be accomplished by releasing the clutch C1 and connecting the clutch C2 (with slip connection control), i.e., by executing a clutch switch operation (i.e., reversing the engagement states of the clutches C1 and C2). After the switch, the clutch C1 is in a released state and the clutch C2 is in a connected state.

In this state, the engine torque is transmitted from the clutch C2 to the output shaft 6 through the second input shaft 5, the second-speed gear set G2, the counter shaft 10, and the output gear set comprising the gears 11 and 12 and outputted from the output shaft 6, thereby enabling power to be transmitted with the second speed gear ratio.

When the transmission upshifts from the second speed to the third speed, the coupling sleeve 21a of the synchromeshing mechanism 21 is returned to the neutral position such that the gear 14 is disengaged from the counter shaft 10 and the coupling sleeve 22a of the synchromeshing mechanism 22 is moved rightward such that the gear 19 is drive-connected to the first input shaft 4. This constitutes a pre-shift from the first speed to the third speed within the odd numbered gear group. After the pre-shift, the upshift from second speed to third speed is accomplished by releasing the clutch C2 and connecting the clutch C1 (with slip connection control), i.e., by executing a clutch switch operation.

After the switch, the clutch C1 is in a connected state and the clutch C2 is in a released state.

In this state, the engine torque is transmitted from the clutch C1 to the output shaft 6 through the first input shaft 4, the third-speed gear set G3, the counter shaft 10, and the output gear set comprising the gears 11 and 12 and outputted from the output shaft 6, thereby enabling power to be transmitted with the third speed gear ratio.

When the transmission upshifts from the third speed to the fourth speed, the coupling sleeve 30a of the synchromeshing mechanism 30 is returned to the neutral position such that the gear 26 is disengaged from the counter shaft 10 and the coupling sleeve 30a of the synchromeshing mechanism 30 is moved rightward such that the gear 28 is drive-connected to the counter shaft 10. This constitutes a pre-shift from the second speed to the fourth peed within the even numbered gear group. After the pre-shift, the upshift from third speed to fourth speed is accomplished by releasing the clutch C1 and connecting the clutch C2 (with slip connection control), i.e., by executing a clutch switch operation.

After the switch, the clutch C1 is in a released state and the clutch C2 is in a connected state.

In this state, the engine torque is transmitted from the clutch C2 to the output shaft 6 through the second input shaft 5, the fourth-speed gear set G4, the counter shaft 10, and the output gear set comprising the gears 11 and 12 and outputted from the output shaft 6, thereby enabling power to be transmitted with the fourth speed gear ratio.

When the transmission upshifts from the fourth speed to the fifth speed, the coupling sleeve 22a of the synchromeshing mechanism 22 is returned to the neutral position such that the gear 19 is disengaged from the first input shaft 4 and the coupling sleeve 22a of the synchromeshing mechanism 22 is moved leftward such that the gear 31 is drive-connected to the first input shaft 4. This constitutes a pre-shift from the third speed to the fifth speed within the odd numbered gear group. After the pre-shift, the upshift from fourth speed to fifth speed is accomplished by releasing the clutch C2 and connecting the clutch C1 (with slip connection control), i.e., executing a clutch switch operation. After the switch, the clutch C1 is in a connected state and the clutch C2 is in a released state.

In this state, the engine torque is transmitted from the clutch C1 to the output shaft 6 through the first input shaft 4, the fifth-speed gear set G5, the counter shaft 10, and the output gear set comprising the gears 11 and 12 and outputted from the output shaft 6, thereby enabling power to be transmitted with the fifth speed gear ratio.

When the transmission upshifts from the fifth speed to the sixth speed, the coupling sleeve 30a of the synchromeshing mechanism 30 is returned to the neutral position such that the gear 28 is disengaged from the counter shaft 10 and the coupling sleeve 29a of the synchromeshing mechanism 29 is moved leftward such that the gear 24 is drive-connected to the counter shaft 10. This constitutes a pre-shift from the fourth speed to the sixth peed within the even numbered gear group. After the pre-shift, the upshift from fifth speed to sixth speed is accomplished by releasing the clutch C1 and connecting the clutch C2 (with slip connection control), i.e., by executing a clutch switch operation. After the switch, the clutch C1 is in a released state and the clutch C2 is in a connected state.

In this state, the engine torque is transmitted from the clutch C2 to the output shaft 6 through the second input shaft 5, the sixth-speed gear set G6, the counter shaft 10, and the output gear set comprising the gears 11 and 12 and outputted from the output shaft 6, thereby enabling power to be transmitted with the sixth speed gear ratio.

When the transmission downshifts successively from sixth speed to first speed, the downshifting can be accomplished by executing shift control that is reversed in comparison to the upshift control, i.e., by executing pre-shifts in the opposite directions as described above and executing control to connect and release the clutches C1 and C2 in the opposite manner as described above.

When a driver changes the transmission from a non-moving range to the R range in order to drive in reverse, the coupling sleeve 21a of the synchromeshing mechanism 21 is moved rightward from the neutral position such that the gear 16 is connected to the counter shaft 10. This constitutes a pre-shift to the reverse gear within the odd numbered gear group. After the pre-shift, the wet clutch C1 (which was in a released state when the transmission was in the non-moving range) is connected. After the connection, the clutch C1 is in a connected state and the clutch C2 is in a released state.

In this state, the engine torque is transmitted from the clutch C1 to the output shaft 6 through the first input shaft 4, reverse gear set GR, the counter shaft 10, and the output gear set comprising the gears 11 and 12 and outputted from the output shaft 6, thereby enabling power to be transmitted with the reverse gear ratio.

When the vehicle is started into motion with the reverse gear, a slip connection control is executed to connect the clutch C1 in a manner appropriate for that purpose such that the vehicle starts moving rearward smoothly without any shock associated with starting into motion.

The engine speed suppression control executed in the illustrated embodiment will now be explained.

Figure 2:
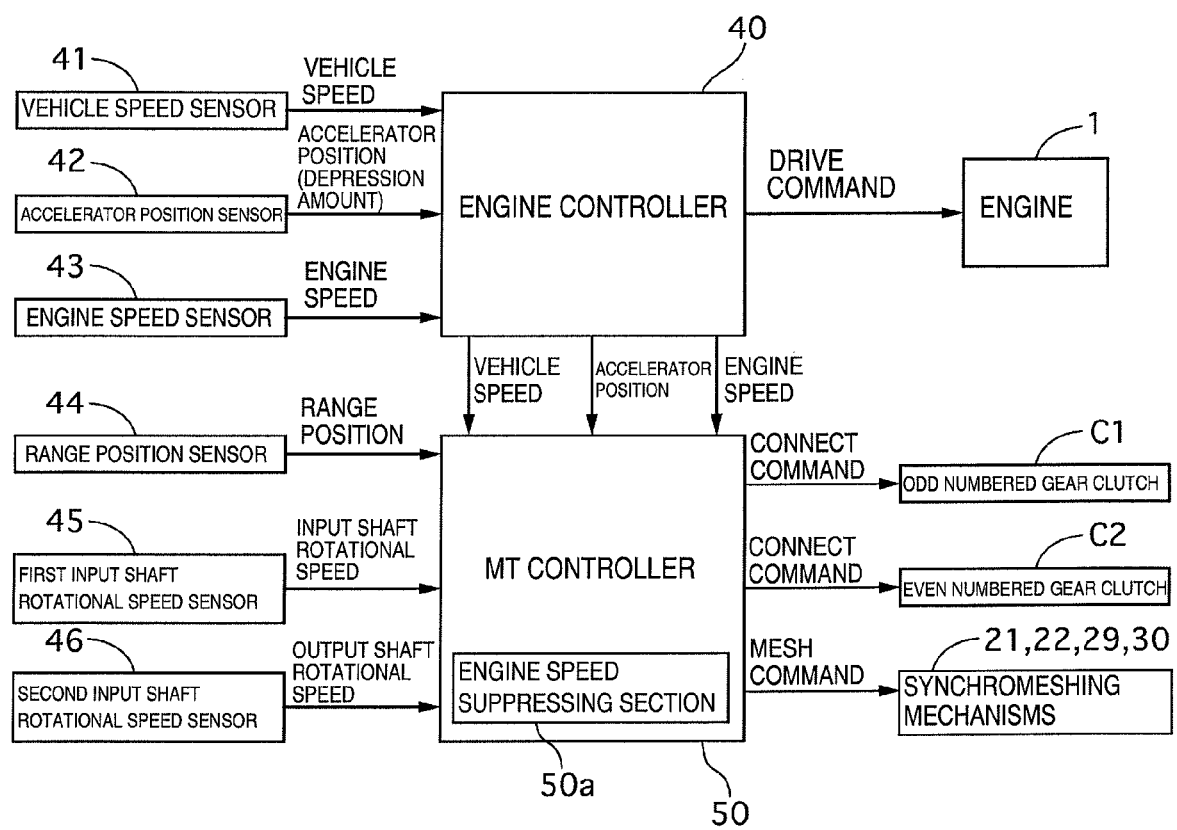
FIG. 2 is a block diagram showing a control system for the twin clutch automatic manual transmission in accordance with the illustrated embodiment.

FIG. 2 is a block diagram showing a control system for a twin clutch automatic manual transmission in accordance with the illustrated embodiment. An engine controller 40 is configured to adjust a fuel injection amount and/or other parameters to control an engine torque based on a vehicle speed (vehicle body speed) received from a vehicle speed sensor 41, an accelerator position received from an accelerator position sensor 42, and an engine rotational speed received from an engine speed sensor 43.

A MT controller 50 is configured to select a prescribed gear using shift maps based on a vehicle speed, an accelerator position, and an engine speed from the engine controller 40, a range position from a range position sensor 44, a rotational speed of the first input shaft 4 from a first input shaft rotational speed sensor 45, and a rotational speed of the second input shaft 5 from a second input shaft rotational speed sensor 46 and to control the synchromeshing mechanisms 21, 22, 29, and 30 and the clutch capacities of the clutches C1 and C2 accordingly through a hydraulic control circuit (not shown).

The MT controller 50 uses an equation (1) shown below to calculate the clutch torque based on a torque capacity coefficient and the engine speed and executes control of the clutch capacity so as to obtain the calculated clutch torque, thereby simulating a torque converter characteristic.

$$\text{Clutch torque} = \text{torque capacity coefficient} \times (\text{engine speed} \times \text{offset valve})^2 \qquad (1)$$

The torque capacity coefficient is set based on a speed ratio (output rotational speed/input rotational speed) of the clutch. The torque capacity coefficient is set such that it, for example, gradually decreases when the speed ratio is in a range from a prescribed ratio smaller than 1.0 to 1.0, becomes a very small value when the speed ratio is 1.0, increases gradually when the speed ratio is in a range from 1.0 to a prescribed ratio larger than 1.0, and remains at a constant value when the speed ratio is larger than the prescribed ratio larger than 1.0.

The input rotational speed can be calculated based on a detection value from the engine speed sensor 43 and a characteristic of a torsional damper 8. The output rotational speed can be detected by the first input shaft rotational speed sensor 45 or the second input shaft rotational speed sensor 46.

It is also acceptable to set the torque capacity coefficient such that it becomes smaller as the accelerator depression amount becomes larger in order to prevent the engine speed from revving to a high value.

The offset value is set in accordance with the accelerator depression amount (accelerator position). More specifically, the offset value is set to decrease gradually when the accelerator position is smaller than or equal to a prescribed value (e.g., ⅔) and to be zero when the depression amount exceeds ⅔. As a result, the clutch torque is smaller when the engine speed is low, e.g., when the engine is idling, and, thus, the occurrence of engine stalling is suppressed.

The engine speed suppression control executed in the illustrated embodiment will now be explained.

The MT controller 50 includes an engine speed suppressing section (engine speed suppressing section) 50a. The engine speed suppressing section 50a is configured to execute an engine speed suppression control when an accelerator operation performed by a driver is detected during a clutch switch operation associated with downshifting (i.e., a torque phase of a downshift operation) while the vehicle is coasting. The engine speed suppression control is configured to change a clutch capacity of a clutch being released (capacity of clutch being released) and a clutch capacity of a clutch being connected (capacity of clutch being connected) in comparison with the clutch capacities that would occur if shifting was taking place during normal coasting in which an accelerator operation is not being performed. In this embodiment, "downshifting while the vehicle is coasting" refers to an automatic shifting of the transmission from a higher gear (higher gear ratio) to a lower gear (lower gear ratio) while the vehicle is coasting as a result of the accelerator being in an off position.

The engine speed suppression control ends when the torque phase is completed, i.e., at a point in time when the capacity of the clutch being released and the capacity of the clutch being connected change in comparison with the capacities in effect immediately before the downshift operation was executed.

The method of setting the capacity of the clutch being released and the capacity of the clutch being connected during the engine speed suppression control will now be explained.

(a) Method of setting capacity of clutch being released

Immediately after the engine speed suppression control starts, the capacity of the clutch being released is momentarily increased by a prescribed amount, and then, decreased at a fixed decrease rate until the engine speed reaches a post-shift target rotational speed. The fixed decrease rate is smaller than a decrease rate that would be used if the transmission was shifting in the manner it normally shifts during coasting. In the illustrated embodiment, as an accelerator depression amount becomes larger, the initial momentary capacity is set to a larger value. Meanwhile, the torque capacity decrease rate is set such that as an accelerator depression amount becomes larger, the decrease amount becomes smaller.

When the engine speed reaches the post-shift target rotational speed, the decrease rate is increased.

(b) Method of setting capacity of clutch being connected

During a period from when the engine speed suppression control starts until the engine speed reaches the post-shift target rotational speed, the capacity of the clutch being connected is increased at a fixed increase rate that is smaller than an increase rate that would be used if the transmission was shifting in the manner it normally shifts during coasting. Meanwhile, the torque capacity increase rate is set such that as an accelerator depression amount becomes larger, the increase amount becomes smaller.

When the engine speed reaches the post-shift target rotational speed, the torque capacity increase rate is increased.

(c) Setting conditions for capacity of clutch being released and capacity of clutch being connected The capacity of the clutch being released and the capacity of the clutch being connected are set such that during the period from when the engine speed suppression control starts until the engine speed reaches the post-shift target rotational speed, the sum of the clutch torques of the two clutches C1 and C2 is larger than the engine torque. The clutch capacities are set in this manner to reliably prevent the engine speed from rising sharply. If the sum of the two clutch torques is smaller than the engine torque, then the engine speed will overshoot the post-shift target rotational speed and the engine will rev.

Additionally, the capacity of the clutch being released is set to be smaller than the engine torque in order to prevent interlocking of the transmission.

Operational effects of the illustrated embodiment will now be explained.

Figure 3:
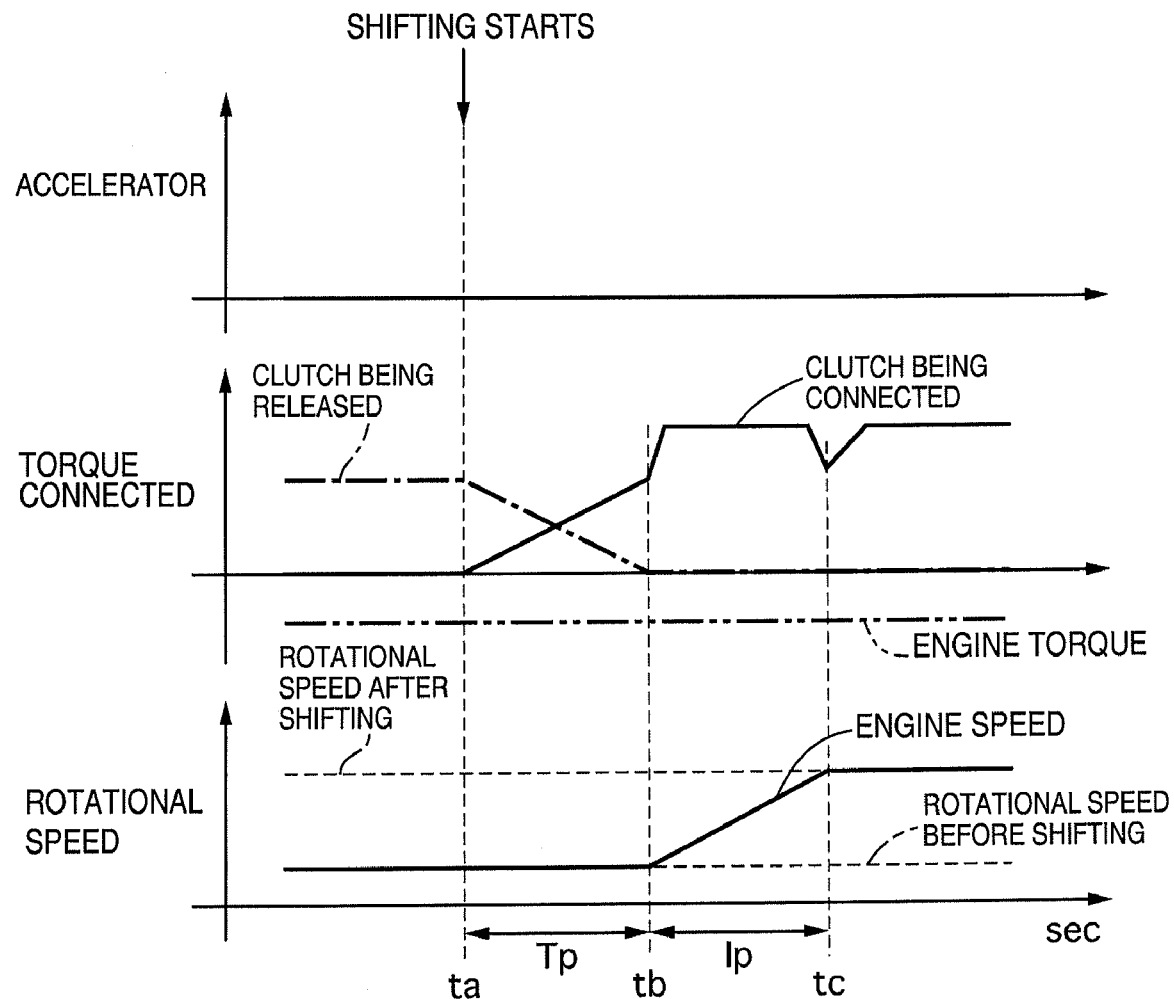
FIG. 3 is a time chart of a clutch torque and an engine speed during downshifting while the vehicle is coasting.

First, downshifting during coasting will be discussed with reference to FIG. 3. FIG. 3 is a time chart of the clutch torque and engine speed during downshifting while the vehicle is coasting. In other words, FIG. 3 illustrates a case in which the driver does not perform any operations during auto-downshifting while the vehicle is coasting.

At a time ta, a prescribed shift condition is satisfied and shifting starts with the transmission entering a torque phase in which the engagement states of a clutch being released and a clutch being connected are switched (clutch switch operation) while maintaining the engine speed at a pre-shift rotational speed (engine speed that existed before shifting started).

During a period from the time ta to a time tb, the capacity of the clutch being released is decreased at a preset rate and the capacity of the clutch being connected is increased at a preset rate such that the engine speed is maintained at the pre-shift rotational speed.

At the time tb, the clutch switch operation ends and the transmission moves from the torque phase to an inertia phase. During a period from the time tb to a time tc, the capacity of the clutch being connected is increased further such that the engine speed is raised to the post-shift target rotational speed. The shift control is contrived such that when the transmission downshifts while the vehicle is coasting, the clutch being connected raises the engine speed after the torque phase ends because the engine is in a coasting state.

At the time tc, the shift operation ends because the engine speed has reached the post-shift target rotational speed.

Figure 4:
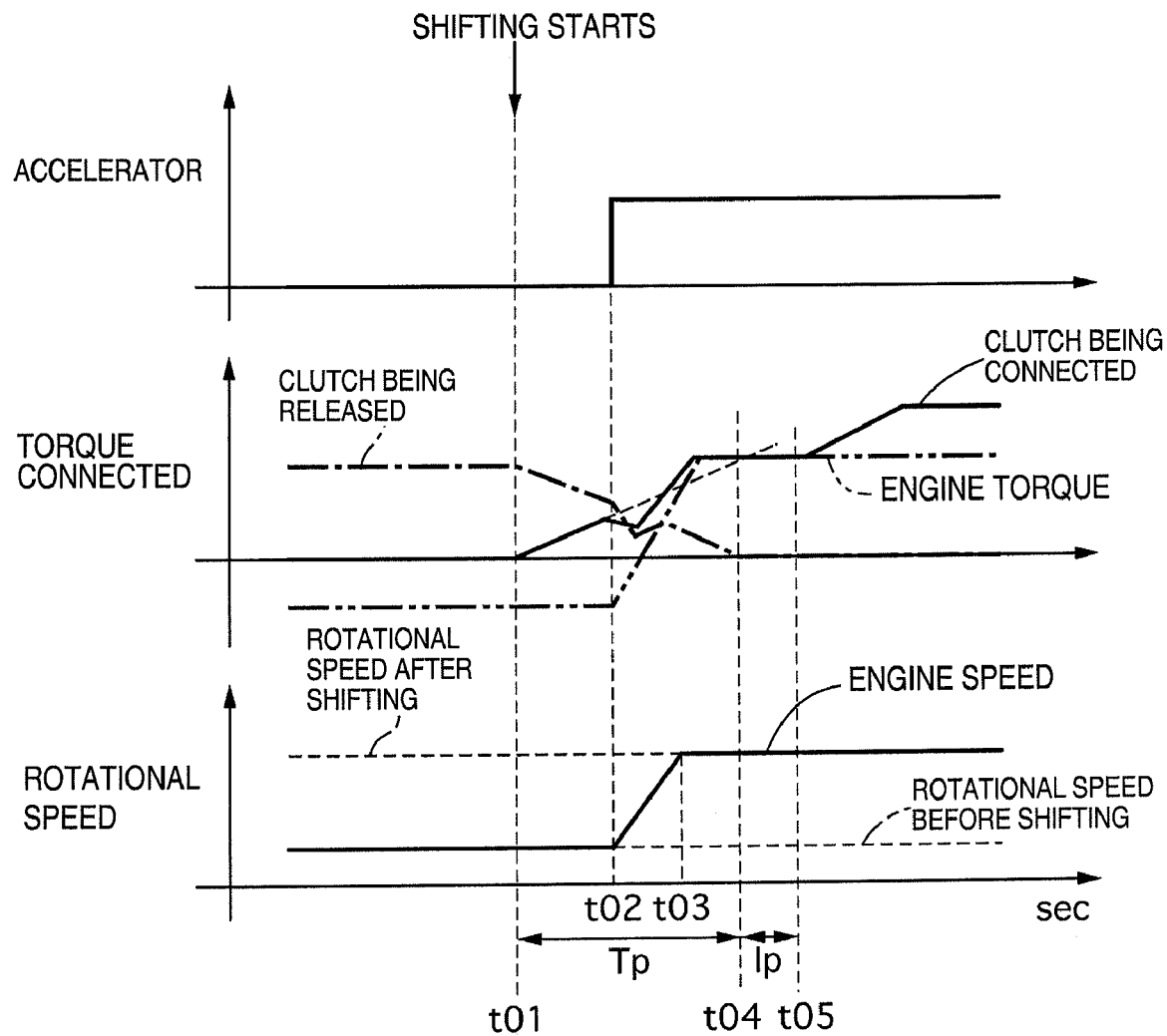
FIG. 4 is a time chart of the clutch torque and the engine speed in a situation where a driver depresses an accelerator of the vehicle during downshifting while the vehicle is coasting.

Shift shock resulting from acceleration operation by driver will be discussed with reference to FIG. 4. FIG. 4 illustrates a case in which the driver depresses the accelerator pedal during auto-downshifting (the torque phase of a downshift operation) while the vehicle is coasting. As shown in FIG. 4, if the shift operation starts at a time t01 and the driver depresses the accelerator at a time t02, then at the time t02 the engine changes from a coasting state to a driving state.

During a period from the time t02 to a time t03, both clutch torques fall momentarily due to a strengthened tendency to interlock caused by a generation of engine torque. Afterwards, the torque of the clutch being connected increases proportionally to the square of the engine speed as indicated in the equation (1), and the torque of the clutch being released decreases at a decrease rate that is the same as during normal coasting in which the accelerator pedal is not being depressed.

When the torque of the clutch being connected increases, it causes the engine speed to rise and, in response, the torque of the clutch being connected increases even more. As a result, a sharp rise in engine speed is accompanied by a sharp increase in the torque of the clutch being connected and shift shock occurs.

If the accelerator pedal is depressed during downshifting while the vehicle is coasting, then a control acting to increase the torque of the clutch being connected in accordance with the engine speed will interfere with the control acting to increase the capacity of the clutch being connected during the clutch switch operation. Consequently, the engine speed cannot be maintained at a speed corresponding to the accelerator position and the torque of the clutch being connected will increase excessively.

At a time t04, the transmission completes the clutch switch operation and changes from the torque phase to the inertia phase. Since the engine speed has already reached the post-shift target rotational speed at the time t03, the shift control is ended at a time t05.

Engine speed suppressing action will be discussed. The MT controller 50 of the illustrated embodiment is contrived such that the engine speed suppressing section 50a executes an engine speed suppression control when a driver performs an accelerator operation during a clutch switch operation associated with downshifting while the vehicle is coasting. As a result, in such a situation, the rate at which the capacity of the clutch being released decreases is reduced (slowed) in comparison with the rate that would be used if the downshifting was taking place during normal coasting in which the driver does not operate the accelerator. By allowing the capacity of the clutch being released to remain longer and pull the engine speed along, the engine speed is prevented from rising sharply and the shift shock can be held to a small level. Since the torque capacity decrease rate of the clutch being released is set to be smaller when the accelerator depression amount is larger, the increase of the engine speed can be suppressed in an effective manner instead of allowing the engine speed to increase in accordance with the accelerator depression amount.

The engine speed suppressing section 50a is also configured to momentarily increase the capacity of the clutch being released by a prescribed amount immediately after the engine speed suppression control starts and, then, decrease the same at a fixed decrease rate. By increasing the engine load when the engine speed starts to increase, the spike in the engine speed is smoothed and the increase of the engine speed can be suppressed in an effective manner. Since the torque of the clutch being released is set to be smaller than the engine torque, interlocking can be prevented.

The engine speed suppressing section 50a sets the torque capacity increase rate of the clutch being connected to be smaller (slower) than it would be if the transmission was shifting during normal coasting in which an accelerator operation is not performed. The reason for suppressing the torque increase of the clutch being connected is to suppress the amount by which the engine speed is raised due to the torque of the clutch being connected. In this working example, the torque capacity increase rate of the clutch being connected is set to be smaller the larger the accelerator depression amount is. As a result, the torque increase of the clutch being connected can be effectively suppressed instead of being allowed to increase along with an increase in the engine speed corresponding to an accelerator depression amount.

Consider a case in which the torque capacity decrease rate of the clutch being released is set in the same manner as when the transmission downshifts during normal coasting and only the torque capacity increase rate of the clutch being connected is changed. In such a case, the torque increase of the clutch being connected can be suppressed, but the engine speed cannot be suppressed by increasing the engine load and the engine will rev up.

Conversely, with the illustrated embodiment, since the control is based on suppressing the engine speed using the torque of the clutch being released, the engine does not become revved up and the occurrence of shift shock can be suppressed. Simultaneously, since the torque increase of the clutch being connected is suppressed, the engine speed can be prevented from being raised by the torque of the clutch being connected and shift shock can be suppressed even more effectively.

Additionally, the engine speed suppressing section 50a is configured to control the capacity of the clutch being released and the capacity of the clutch being connected such that a sum of the clutch torques of the two clutches C1 and C2 is a larger value than the engine torque during a period from when the engine speed suppression control starts until the engine speed reaches a post-shift target rotational speed. As a result, the engine speed can be reliably prevented from rising sharply.

When the engine speed reaches the post-shift target rotational speed, the torque capacity decrease rate of the clutch being released and the torque capacity increase rate of the clutch being connected are both increased. When the engine speed reaches the target value and stops changing, the clutch switch operation is advanced so as to end the inertia phase early. In this way, the amount of time required for the shift operation can be prevented from being excessively long in comparison with normal shifting during coasting.

Figure 5:
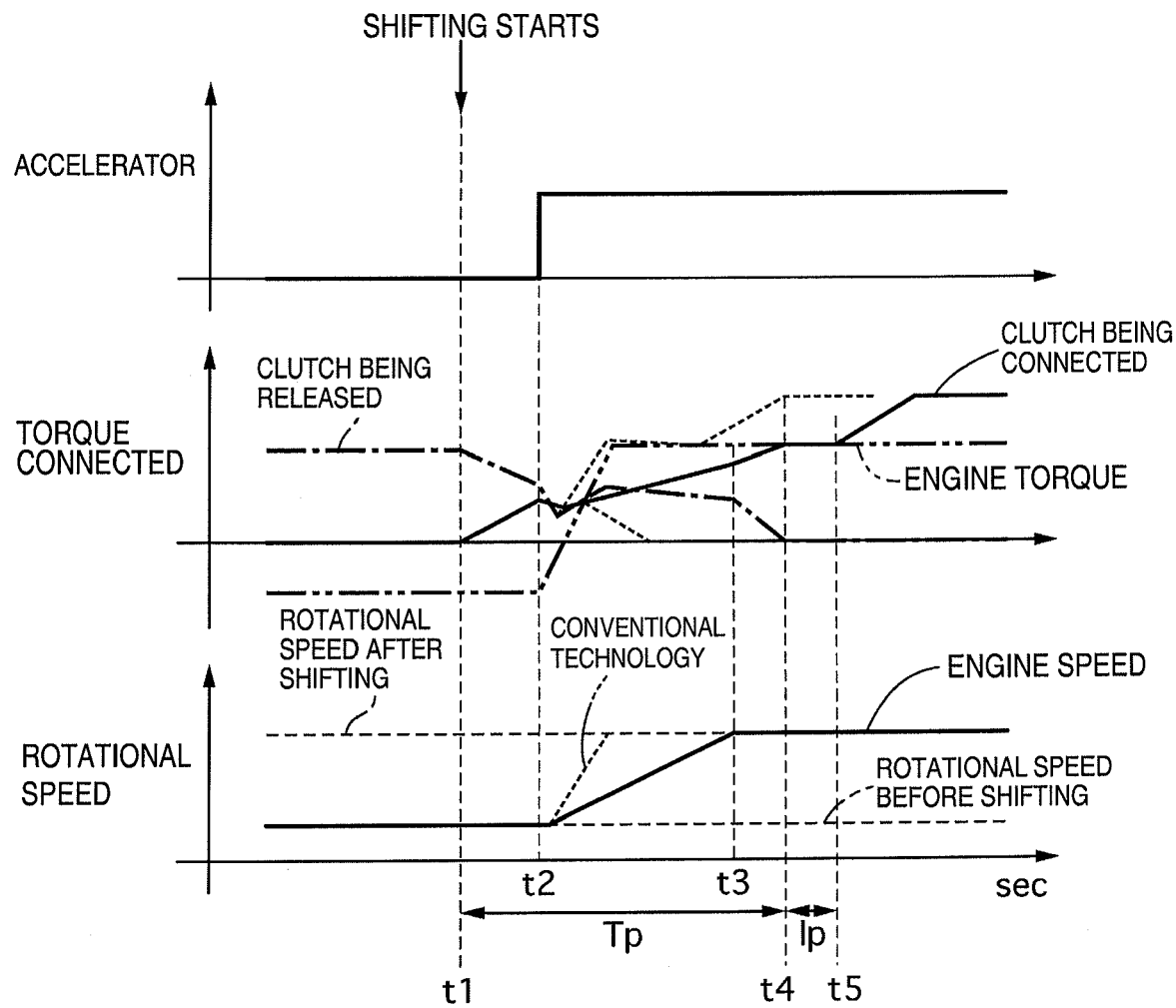
FIG. 5 is a time chart of the clutch torque and the engine speed illustrating the engine speed suppression control executed in the illustrated embodiment.

FIG. 5 is a time chart of the clutch torque and the engine speed illustrating the engine speed suppression control executed in the illustrated embodiment. FIG. 5 illustrates a control that is executed when the driver depresses the accelerator during auto-downshifting while the vehicle is coasting. The dotted-line curve indicates the result obtained with the conventional control. As shown in FIG. 5, the shift operation starts at a time t1 and engine changes from a coasting state to a driving state at a time t2 because the driver depresses the accelerator. During the period between the time t2 and a time t3, an engine speed suppression control is executed which serves to control the torque of the clutch being released so as to apply a drag to the engine speed (resistance to increasing engine speed) and to reduce the increase rate of the torque of the clutch being connected. This engine speed suppression control enables the rate at which the engine speed rises and the rate at which the torque of the clutch being connected to be slowed down in comparison with conventional technologies. In short, this engine speed suppression control simultaneously enables revving of the engine to be prevented and shift shock to be suppressed.

At the time t3, the torque decrease rate the clutch being released and the torque increase rate of the clutch being connected are both increased because the engine speed has reached the post-shift target rotational speed. Then, at a time t4, the clutch switch operation is completed and the transmission changes from the torque phase to the inertia phase. At a time t5, the shift operation ends.

The effects of the illustrated embodiment will now be explained.

A vehicle shift control apparatus in accordance with the illustrated embodiment provides the effects listed below.

(1) The apparatus is provided with an engine speed suppressing section 50a configured to execute an engine speed suppression control when a driver operates the accelerator pedal during the coasting. The engine speed suppression control is configured to reduce a torque capacity decrease rate of a clutch being released in comparison with a torque capacity decrease rate that would be used if shifting was taking place during normal coasting in which the accelerator is not operated. As a result, the engine load is increased and the engine speed can be prevented from rising sharply. Also, the shift shock associated with the accelerator being operated during downshifting while the vehicle is coasting can be suppressed.

(2) The engine speed suppression control executed by the engine speed suppressing section 50a is configured to set the torque capacity decrease rate of the clutch being released to be smaller when the accelerator depression amount is larger. As a result, the increase of the engine speed can be suppressed in an effective manner instead of allowing the engine speed to increase in accordance with the accelerator depression amount.

(3) The engine speed suppression control executed by the engine speed control section 50a is configured to decrease the capacity of the clutch being released at a set decrease rate after momentarily increasing the same. As a result, the spike in the engine speed is smoothed and the increase of the engine speed can be suppressed in an effective manner.

(4) The engine speed suppression control executed by the engine speed suppressing section 50a is contrived reduce the torque capacity increase rate of the clutch being connected in comparison with the torque capacity increase rate used when shifting during normal coasting. As a result, the increase of the torque of the clutch being connected is suppressed and the shift shock can be held to a small level.

(5) The engine speed suppression control executed by the engine speed suppressing section 50a is configured to set the torque capacity increase rate of the clutch being connect to be smaller when the accelerator depression amount is larger. As a result, the increase of the torque of the clutch being connected can be suppressed in an effective manner instead of being allowed to increase along with an increase in the engine speed corresponding to an accelerator depression amount.

(6) The engine speed suppressing section 50a is configured to control the capacity of the clutch being released and the capacity of the clutch being connected such that a sum of the clutch torques of the two clutches C1 and C2 is a larger value than an engine torque during a period from when the engine speed suppression control starts until the engine speed reaches a post-shift target rotational speed. As a result, the engine speed can be reliably prevented from rising sharply.

(7) The engine speed suppressing section 50a is contrived such that when the engine speed reaches the post-shift target rotational speed, the torque capacity decrease rate and the torque capacity increase rate are both increased in comparison with an immediately preceding value (value corresponding to the accelerator position). As a result, the increase in the amount of time required for the shift operation resulting from the engine speed suppression control can be suppressed.

Although in the illustrated embodiment the apparatus is installed in a vehicle having a twin clutch automatic manual transmission, the present invention can be applied to any vehicle having a transmission that is arranged between an engine and a drive wheel and configured to shift gears by executing a clutch switch operation so as to change a drive transmission path. Moreover, when applied to such a vehicle, the same effects can be obtained as in the illustrated embodiment.

Although in the illustrated embodiment, the capacity of the clutch being released is increased by a prescribed amount immediately after the engine speed suppression control starts and then decreased at a decrease rate corresponding to the accelerator depression amount, it is also acceptable for the prescribed amount to be zero. For example, the control can be configured such that the capacity of the clutch being released remains fixed for a prescribed amount of time, after which the capacity of the clutch being released is decreased at a decrease rate corresponding to the accelerator depression amount.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle shift control apparatus comprising:
an engine;
a drive wheel;
a transmission operatively disposed between the engine and the drive wheel for shifting gears by executing a clutch switch operation so as to change a drive transmission path of the transmission; and
a controller operatively to the transmission to control a gear shifting of the transmission, the controller including
an engine speed suppressing section configured to execute an engine speed suppression control when a driver performs an accelerator operation during the clutch switch operation associated with downshifting while coasting, the engine speed suppression control being further configured to reduce a torque capacity decrease rate of a clutch being released in comparison with a torque capacity decrease rate that would occur if shifting was taking place during normal coasting in which the accelerator operation is not performed.

2. The vehicle shift control apparatus as recited in claim 1, wherein
the engine speed suppressing section is further configured to reduce the torque capacity decrease rate during the engine speed suppression control such that as an accelerator depression amount becomes larger, the torque capacity decrease rate is set to a smaller value.

3. The vehicle shift control apparatus as recited in claim 1, wherein
the engine speed suppressing section is further configured to first increase a torque capacity of the clutch being released by a prescribed amount, and then subsequently reduce the torque capacity of the clutch being released at the capacity decrease rate that was set during the engine speed suppression control by the engine speed suppressing section.

4. The vehicle shift control apparatus as recited in claim 1, wherein
the engine speed suppressing section is further configured such that during the engine speed suppression control, the engine speed suppressing section reduces a torque capacity increase rate of a second clutch being connected in comparison with a torque capacity increase rate that would occur if shifting was taking place during the normal coasting in which the accelerator operation is not performed.

5. The vehicle shift control apparatus as recited in claim 4, wherein
the engine speed suppressing section is configured to reduce the torque capacity increase rate during the engine speed suppression control such that as an accelerator depression amount becomes larger, the torque capacity increase rate is set to a smaller value.

6. The vehicle shift control apparatus as recited in claim 4, wherein
the engine speed suppressing section is configured to control a torque capacity of the clutch being released and a torque capacity of the second clutch being connected such that a sum of the clutch torques of the clutches being released and connected is a larger value than an engine torque during a period from when the engine speed suppression control starts until an engine speed reaches a post-shift target rotational speed.

7. The vehicle shift control apparatus as recited in claim 6, wherein
the engine speed suppressing section is configured to increase the torque capacity decrease rate and the torque capacity increase rate immediately after the engine speed reaches the post-shift target rotational speed.

* * * * *